United States Patent
Johansson et al.

(10) Patent No.: US 9,699,782 B2
(45) Date of Patent: *Jul. 4, 2017

(54) METHOD AND ARRANGEMENT IN A TELECOMMUNICATION SYSTEM

(71) Applicant: Optis Wireless Technology, LLC, Plano, TX (US)

(72) Inventors: Anders Johansson, Hasselby (SE); Leo Hedlund, Alvsjo (SE)

(73) Assignee: OPTIS WIRELESS TECHNOLOGY, LLC, Plano, TX (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/484,381

(22) Filed: Sep. 12, 2014

(65) Prior Publication Data

US 2014/0376507 A1    Dec. 25, 2014

Related U.S. Application Data

(63) Continuation of application No. 12/338,469, filed on Dec. 18, 2008, now Pat. No. 8,837,379.

(Continued)

(30) Foreign Application Priority Data

Nov. 7, 2008   (SE) .................. PCT/SE2008/051275

(51) Int. Cl.
   *H04W 72/04*   (2009.01)
   *H04W 48/12*   (2009.01)
   (Continued)

(52) U.S. Cl.
   CPC ....... *H04W 72/0446* (2013.01); *H04L 5/0037* (2013.01); *H04L 5/0053* (2013.01);
   (Continued)

(58) Field of Classification Search
   None
   See application file for complete search history.

(56) References Cited

U.S. PATENT DOCUMENTS

| 7,197,323 B2 | 3/2007 | Terry |
| 2003/0063620 A1 | 4/2003 | You et al. |

(Continued)

FOREIGN PATENT DOCUMENTS

| GB | 2394623 A | 4/2004 |
| WO | 2004013978 A1 | 2/2004 |

(Continued)

OTHER PUBLICATIONS

Office Action received in Canadian Patent Application No. 2,710,155, dated May 9, 2016, 4 pages.

(Continued)

*Primary Examiner* — Sulaiman Nooristany (57) ABSTRACT

The downlink control channels in a control region of each downlink subframe in a telecommunication system are divided into at least one common subset of the downlink control channels and a plurality of group subsets of the downlink control channels, such that the common subset or each common subset will be decoded by every user equipment, and each group subset will be decoded only by a limited group of user equipments. Resource assignment messages for a user equipment can then be transmitted on a downlink control channel of the relevant group subset, to avoid the need for messages to be decoded by a large number of UEs that will not act on them, while broadcast messages can be transmitted on a downlink control channel of the relevant common subset, to avoid the need for messages to be transmitted many times.

4 Claims, 5 Drawing Sheets

Related U.S. Application Data (60) Provisional application No. 61/015,347, filed on Dec. 20, 2007.

(51) Int. Cl.
  *H04L 1/00* (2006.01)
  *H04L 5/00* (2006.01)
  *H04W 52/02* (2009.01)

(52) U.S. Cl.
  CPC ......... *H04W 48/12* (2013.01); *H04W 72/042* (2013.01); *H04L 1/009* (2013.01); *H04L 1/0038* (2013.01); *H04L 1/0091* (2013.01); *H04L 5/0007* (2013.01); *H04W 52/0222* (2013.01); *Y02B 60/50* (2013.01)

(56) References Cited

U.S. PATENT DOCUMENTS

| | | | | |
|---|---|---|---|---|
| 2008/0085718 | A1* | 4/2008 | Kuchibhotla | H04W 72/042 455/452.1 |
| 2008/0212701 | A1 | 9/2008 | Pan et al. | |
| 2009/0010213 | A1 | 1/2009 | Yamada et al. | |
| 2009/0088148 | A1 | 4/2009 | Chung et al. | |
| 2009/0161618 | A1 | 6/2009 | Johansson et al. | |
| 2009/0325585 | A1 | 12/2009 | Farajidana et al. | |
| 2010/0098020 | A1* | 4/2010 | Kim | H04L 1/0027 370/330 |

FOREIGN PATENT DOCUMENTS

| | | | |
|---|---|---|---|
| WO | 2007044173 | A2 | 4/2007 |
| WO | 2007052971 | A1 | 5/2007 |
| WO | 2007091174 | A2 | 8/2007 |
| WO | 2008081004 | A1 | 7/2008 |
| WO | 2009041779 | A1 | 4/2009 |

OTHER PUBLICATIONS

Motorola, "Search Space Definition for L1/L2 Control Channels," 3GPP TSG RAN1#50, R1-073373, Athens, Greece, Aug. 20-24, 2007, 11 pages.

Motorola, "E-UTRA Downlink Control Channel Structure and TP," 3GPP TSG RAN1#44, R1-060378, Denver, Colorado, Feb. 13-17, 2006, 7 pages.

Notice of Allowance received in Korean Patent Application No. 10-2010-7016130, dated May 18, 2016, 2 pages.

LG Electronics, RACH Design Issues of Large Cell Deployment; 3GPP TSG RAN WG1 Meeting #46bis, R1-062557, Seoul, Korea, Oct. 9-13, 2006 (6 pgs).

LGE, RACH Sequence Extension Methods for Large Cell Deployment, 3GPP TSG RAN1 L TE WG1 Meeting #46, R1-062306, Tallinn, Estonia, Aug. 28,-Sep. 1, 2006 (7 pgs).

Random Access Design for UMTS Air-Interface Evolution, Ametava Ghosh, et al, Networks and Enterprise Business, Motorola (5 pgs).

International Preliminary Report on Patentability (IPRP) dated Jan. 15, 2010, corresponding to International Application No. PCT/SE2008/050826 (5 pgs).

International Search Report dated Oct. 31, 2008, corresponding to International Application No. PCT/SE2008/050826 (3 pgs).

Motorola. Search Space Definition Reduced PDCCH Blind Detection for Split PDCCH Search Space. 3GPP TSG-RAN BG1 #50 BIS, R1-073996. Oct. 12, 2007.

ZTE CCE Allocation Scheme is PDCCH for Efficient Blind Detection. 3GPP TSG-RAN BG1 #51, R1-074559. Nov. 9, 2007.

Samsung. Restriction on PDGGH Monitoring Set 3GPP TSG-RAN BG1 #49; R1-073120. Jun. 29, 2007.

International Preliminary Report on Patentability (IPRP) dated Mar. 8, 2010, corresponding to International Application No. PCT/SE2008/051275.

Written Opinion Dated Dec. 9, 2009, corresponding to International Application No. PCT/SE2008/051275.

PCT International Search Report, mailed Mar. 26, 2009, in connection with International Application No. PCT/SE2008/051275.

PCT Written Opinion, mailed Mar. 26, 2009, in connection with International Application No. PCT/SE2008/051275.

Motorola: "3GPP TSG RAN 1 #50 R1-073373 Search Space Definition for L1/L2 Control Channels" 3GPP TSG 3 RAN 1 #50, R1-073373, No. 50, Aug. 20, 2007, 11 pages.

Motorola:"E-UTRA Downlink Control Channel Structure and TP" 3GPP Draft; R1-060378_DLCONTROL + TP, 3rd Generation Partnership Project (3GPP), Mobile Competence Centre; 650, Route Des Lucioles; F-06921 Sophia-Antipolis Cedex; France, vol. tsg_ran\WG1_RL 1\TSGR1_4 4\Docs, No., Denver, USA; 20060213; Feb. 8, 2006, XP050101324.

Editor (Motorola): "Update of 36.213" 3GPP Draft; R1-075116 CR 36.213-0001 R2 (Rel-8, F), 3rd Generation Jartnership Project (3GPP), Mobile Competence Centre; 650, Route Des Lucioles; F-06921 Sophia-Antipolis Cedex; France, vol. tsg_ran\WG1_RL 1\TSG1_51\Docs, No. Korea; 20071105, Nov. 22, 2007, XP050108542.

Ericsson: "PDCCH blind decoding—Outcome of offline discussions" [Online] No. R1-081101, Feb. 11, 2008, pp. 1-7, XP002519025. Retrieved from the Internet: URL:http://www.quintillion.co.jp/3GPP/TSG_RAN/TSG_RAN2008/TSG_RAN_WG1—RL 1_2.html.

'3rd Generation Partnership Project; Technical Specification Group Radio Access Network (E-UTRA); Evolved Universal Terrestrial Radio Access; Physical Layer Procedures (Release 8): 3GPP TS 36.213 V8.2.0, [Online] Mar. 2008, pp. 1-30, XP002519043, Sophia-Antipolis, France. Retrieved from the Internet: URL:http://www.3gpp.org/ftp/Specs/html-info/36213.htm.

\* cited by examiner

METHOD AND ARRANGEMENT IN A TELECOMMUNICATION SYSTEM

RELATED APPLICATIONS

This application is a continuation of U.S. application Ser. No. 12/338,469, filed Dec. 18, 2008, entitled "Method and Arrangement in a Telecommunication System," which claims priority and benefit from International Application No. PCT/SE2008/051275, filed on Nov. 7, 2008, entitled "Method and Arrangement in a Telecommunication System," which claims priority to U.S. Provisional Application No. 61/015,347, entitled "Method and Arrangement in a Telecommunication System," filed on Dec. 20, 2007, the entire contents of each said applications hereby incorporated herein by reference.

TECHNICAL FIELD

This invention relates to a method and arrangement in a telecommunication system, and in particular to a method for allocating downlink control channels to user equipments.

BACKGROUND

Evolved UTRAN (E-UTRAN), sometimes also referred to as LTE (Long Term Evolution), is a novel radio access technology being standardized by the 3rd Generation partnership Project (3GPP). Only the packet-switched (PS) domain will be supported in E-UTRAN, i.e. all services are to be supported in the PS domain. The standard will be based on OFDM (Orthogonal Frequency Division Multiplexing) in the downlink and SC-FDMA (Single Carrier Frequency Domain Multiple Access) in the uplink.

In the time domain, one subframe of 1 ms duration is divided into 12 or 14 OFDM (or SC-FDMA) symbols, depending on the configuration. One OFDM (or SC-FDMA) symbol consists of a number of subcarriers in the frequency domain, depending on the channel bandwidth and configuration. One OFDM (or SC-FDMA) symbol on one subcarrier is referred to as a Resource Element (RE).

In E-UTRAN no dedicated data channels are used; instead, shared channel resources are used in both downlink and uplink. These shared resources, DL-SCH (Downlink Shared Channel) and UL-SCH (Uplink Shared Channel), are controlled by one or more schedulers that assign different parts of the downlink and uplink shared channels to the UEs for reception and transmission respectively.

The assignments for the DL-SCH and the UL-SCH are transmitted in a control region covering a few OFDM symbols in the beginning of each downlink subframe. The DL-SCH is transmitted in a data region covering the rest of the OFDM symbols in each downlink subframe. The size of the control region is either one, two, three or four OFDM symbols and is set per subframe.

Each assignment for DL-SCH or UL-SCH is transmitted on a physical channel named PDCCH (Physical Downlink Control Channel). There are typically multiple PDCCHs in each subframe and the UEs will be required to monitor the PDCCHs to be able to detect the assignments directed to them.

Groups of resource elements that can be used for the transmission of control channels are referred to as Control Channel Elements (CCEs), and a PDCCH is mapped to a number of CCEs. For example, a PDCCH consists of an aggregation of 1, 2, 4 or 8 CCEs. A PDCCH consisting of one CCE is referred to as a PDCCH at aggregation level 1, a PDCCH consisting of two CCEs is referred to as a PDCCH at aggregation level 2, and so on. Each CCE may only be utilized on one aggregation level at a time. The variable size achieved by the different aggregation levels is used to adapt the coding rate to the required block error rate (BLER) level for each UE. The total number of available CCEs in a subframe will vary depending on several parameters, such as the number of OFDM symbols used for the control region, the number of antennas, the system bandwidth, the PHICH (Physical HARQ Indicator Channel) size etc.

Each CCE consists of 36 REs. However, in order to achieve time and frequency diversity for the PDCCHs, each CCE and its REs are spread out, both in time over the OFDM symbols used for the control region, and in frequency over the configured bandwidth. This is achieved through a number of operations including interleaving, and cyclic shifts etc. These operations are however predefined, and are completely known to the UEs. That is, each UE knows which resource elements make up each CCE, and is therefore able to decode the relevant resource elements in order to decode any desired PDCCH.

The existing system has the disadvantage that, as UEs have no knowledge of where the PDCCHs directed specifically to them are located, each UE has to decode the entire set of possible PDCCHs, i.e. the entire PDCCH space. The entire PDCCH space includes all CCEs on all aggregation levels. This would mean that considerable UE resources are consumed in decoding a large number of PDCCHs, of which only a few were actually directed to them. This will waste the limited UE battery power and hence reduce the UE stand-by time.

SUMMARY

According to a first aspect of the present invention, there is provided a method of allocating communications resources in a telecommunication system, in which the assignments of resources to user equipments are transmitted in a control region of each downlink subframe, the control region comprising a plurality of downlink control channels. The downlink control channels are divided into at least one common subset of the downlink control channels and a plurality of group subsets of the downlink control channels, thereby enabling every user equipment to decode the common subset and only one group subset.

According to a second aspect of the present invention, there is provided a method of operation of a user equipment in order to determine communications resources allocated thereto in a telecommunication system, in which the assignments of resources to user equipments are transmitted in a control region of each downlink subframe, the control region comprising a plurality of downlink control channels. A division of the downlink control channels into at least one common subset of the downlink control channels and a plurality of group subsets of the downlink control channels is determined, and a relevant group subset from the plurality of group subsets is determined. The downlink control channels forming the common subset or each common subset of the downlink control channels are decoded, and only the downlink control channels of the relevant group subset of the downlink control channels are decoded.

According to a third aspect of the present invention, there is provided a network node for a telecommunication system, in which the assignments of resources to user equipments are transmitted in a control region of each downlink subframe, the control region comprising a plurality of downlink control channels. The network node divides the downlink control channels into at least one common subset of the downlink control channels and a plurality of group subsets of the downlink control channels, enabling every user equipment to decode the common subset and only one group subset.

According to a fourth aspect of the present invention, there is provided a user equipment in a telecommunication system, in which the assignments of resources to user equipments are transmitted in a control region of each downlink subframe, the control region comprising a plurality of downlink control channels. The user equipment determines communications resources allocated to it by determining a division of the downlink control channels into at least one common subset of the downlink control channels and a plurality of group subsets of the downlink control channels; and determining a relevant group subset from the plurality of group subsets. The user equipment than decodes the downlink control channels forming the common subset or each common subset of the downlink control channels, and decodes only the downlink control channels of the relevant group subset of the downlink control channels.

This has the advantage that the number of possible PDCCHs that have to be decoded by each UE is reduced. This is achieved by dividing the PDCCH space into a number of subsets where each UE only has to decode PDCCHs from certain subsets.

A subset is defined as a specific set of possible PDCCHs. A common subset is a subset which all UEs shall try to decode. A group subset is a subset which only a limited group of UEs shall try to decode. The exact number of subsets of each type could differ. Also, how these subsets are formed with respect to CCE indices, and aggregation level of CCEs into PDCCHs, could differ.

One potential problem that could arise from introducing subsets of the control channels, and requiring each UE to decode only one subset is that some PDCCH messages will be broadcast to all UEs in the cell, e.g. the SIB (System Information Block) sent on the BCCH (Broadcast Channel). For broadcast messages, the same DL-SCH assignment would have to be sent in every subset in order to reach all UEs. This would mean a waste of the CCE resources.

Another problem with subsets is that the pooling gain with one big pool of CCEs is lost when dividing the resources into a number of subsets. If all UEs are assigned to one subset during one subframe, the CCE resources in the other subsets are lost and the system throughput could suffer.

However, according to the present invention, the disadvantage of the prior art is at least partially obviated, and these new potential disadvantages are not introduced. It is thus the basic idea of the present invention to reduce the number of PDCCHs that a UE has to decode without introducing severe restrictions leading to problems as described above. This is achieved by dividing the entire set of possible PDCCHs into a number of group and common subsets respectively. Each group subset is decoded by a limited group of 0, 1 or more UEs, whereas the common subset, preferably there is only one, is decoded by every single UE. The formation of the subsets is performed in such a way that neither CCE resources have to be wasted in case of broadcasting nor that CCEs are virtually lost for group subsets where the CCE resources are not utilized.

The present invention therefore makes it possible to save UE battery power without preventing the eNodeB from utilising the complete CCE space. Further, the invention allows for an efficient usage of CCEs in case of broadcast messages.

Other objects, advantages and novel features of the invention will become apparent from the following detailed description of the invention when considered in conjunction with the accompanying drawings.

DETAILED DESCRIPTION

Figure 1:
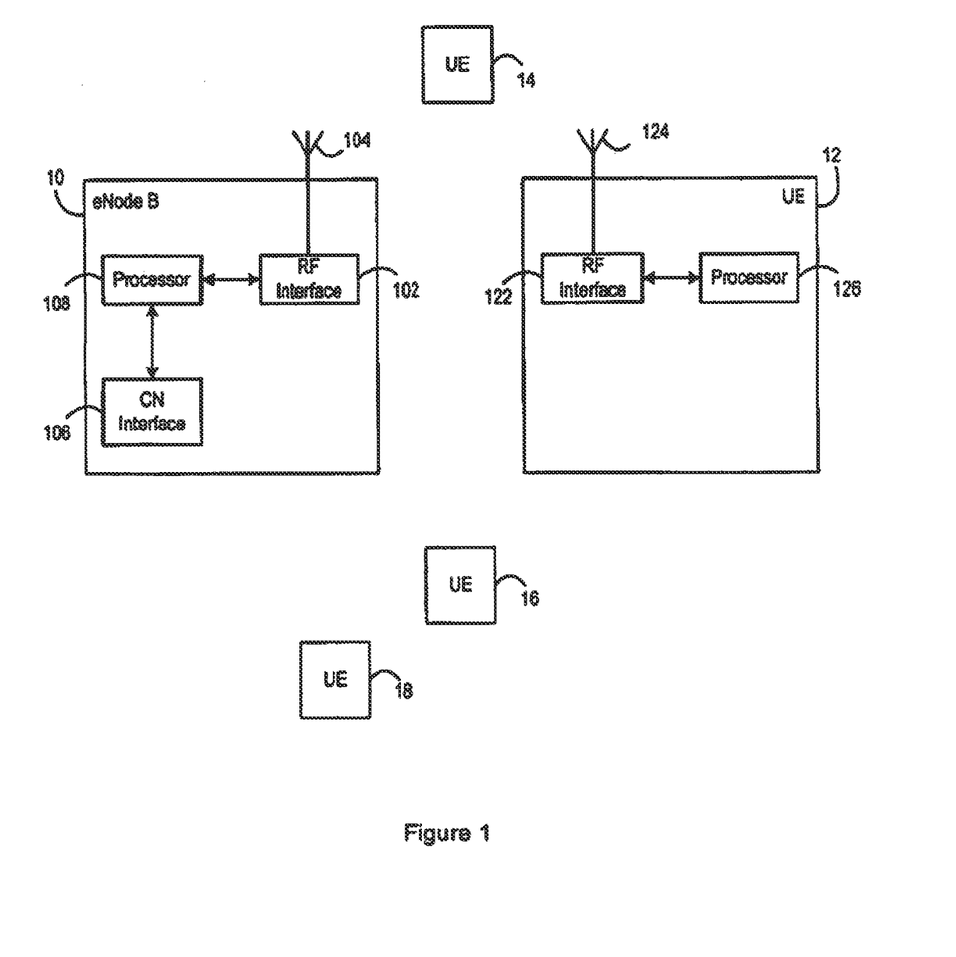
FIG. 1 is a schematic diagram showing a representation of a part of a mobile communications network operating in accordance with an aspect of the present invention.

FIG. 1 shows a part of a mobile communications network operating in accordance with an aspect of the present invention. This illustrated embodiment refers to a network operating in accordance with the Evolved UMTS Terrestrial Radio Access (E-UTRA) standards defined by the 3GPP organization. However, it will be appreciated that the invention may be applied to any network involving allocation of shared resources on a system downlink.

Specifically, FIG. 1 shows a basestation, or eNodeB, 10 in a cell of a cellular network in the form of an Evolved Radio Access Network. In the illustrated embodiment of the invention, the network operates in accordance with a standard based on OFDM (Orthogonal Frequency Division Multiplexing) in the downlink and SC-FDMA (Single Carrier Frequency Domain Multiple Access) in the uplink. FIG. 1 also shows four UEs 12, 14, 16, 18 located within the cell served by the eNodeB 10.

Specifically, FIG. 1 illustrates the general form of the eNodeB 10. The eNodeB 10 has radio frequency (RF) interface circuitry 102, connected to an antenna 104, for transmitting and receiving signals over a wireless interface to the UEs. In addition, there is a core network (CN) interface 106, for connecting the eNodeB 10 to a core network of the mobile communications network. The radio frequency interface circuitry 102 and the core network interface 106 operate under the control of a processor 108. This is generally well understood, and will not be described further herein. In particular, the processor 108 is responsible for allocating signals to the available communications resources, which in this illustrative network comprise resources on particular frequency subcarriers during particular time periods. The processor 108 is also responsible for transmitting resource allocation messages to the UEs. One aspect of such control is relevant for an understanding of the present invention, and is described in more detail below.

FIG. 1 also illustrates the general form of one UE 12, it being understood that the other UEs are generally similar. The UE 12 has radio frequency (RF) interface circuitry 122, connected to an antenna 124, for transmitting and receiving signals over the wireless interface to the eNodeB 10. The radio frequency interface circuitry 122 operates under the control of a processor 126. This is generally well understood, and will not be described further herein. In particular, the processor 126 is responsible for controlling the RF interface circuitry 122, in order to ensure that the intended signals are decoded, and that signals for transmission are applied to allocated communications resources.

Figure 2:
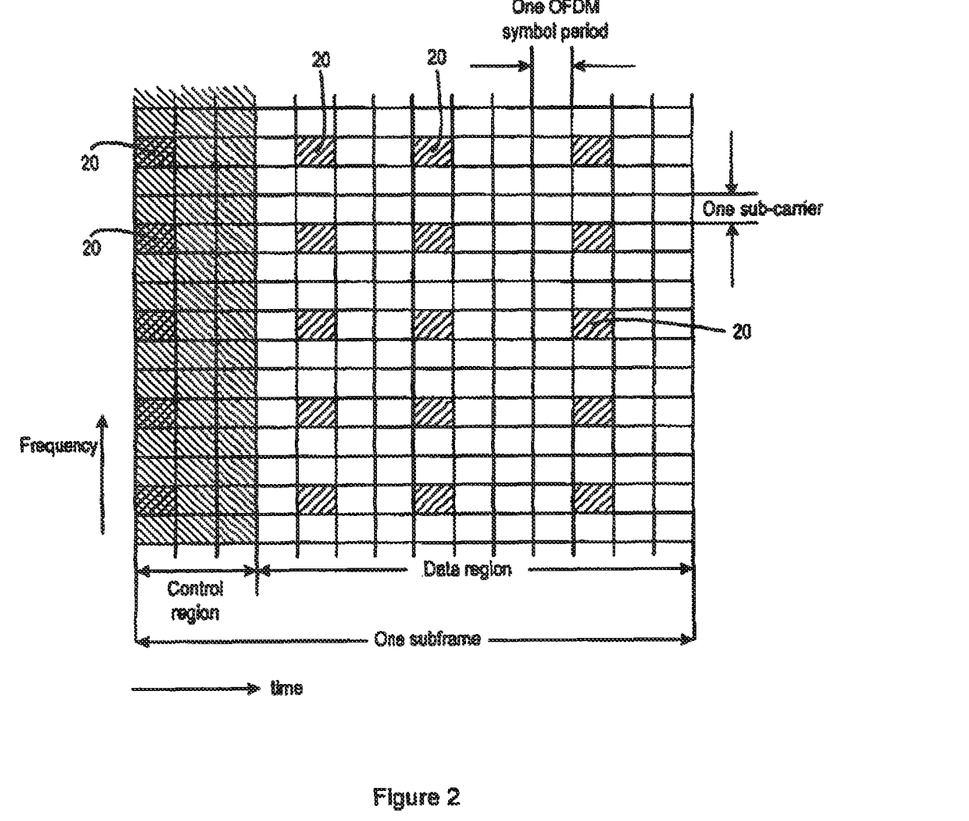
FIG. 2 illustrates one possible division of one downlink subframe in time and frequency.

FIG. 2 illustrates the form of one subframe. As is well known, a subframe of duration 1 ms is divided into 12 or 14 OFDM (or SC-FDMA) symbols, depending on the configuration, and in this example the subframe is divided into 14 OFDM symbols. In the frequency domain, the available bandwidth is divided into subcarriers, depending on the channel bandwidth and configuration. One OFDM (or SC-FDMA) symbol on one subcarrier is referred to as a Resource Element (RE). Certain predefined Resource Elements are used for transmitting reference symbols 20.

Shared channel resources are used in both downlink and uplink, and these shared resources, DL-SCH (Downlink Shared Channel) and UL-SCH (Uplink Shared Channel), are each controlled by one scheduler that assigns different parts of the downlink and uplink shared channels to different UEs for reception and transmission respectively.

The assignments for the DL-SCH and the UL-SCH are transmitted in a control region covering a few OFDM symbols in the beginning of each downlink subframe. The size of the control region is either one, two, three or four OFDM symbols and is set per subframe. The size of the control region for a specific subframe is indicated by the Control Format Indicator (CFI) which is carried by the Physical Control Format Indicator Channel (PCFICH) in the very first OFDM symbol of the same subframe. In the illustrated example shown in FIG. 2, the control region covers the first three OFDM symbols in the subframe. The DL-SCH is transmitted in a data region covering the rest of the OFDM symbols in each downlink subframe. Thus, in this example, the data region covers the last eleven OFDM symbols in each downlink subframe.

Each assignment for DL-SCH or UL-SCH is transmitted on a physical channel named PDCCH (Physical Downlink Control Channel). There are typically multiple PDCCHs in each subframe and the UEs 12, 14, 16, 18 will be required to monitor the PDCCHs to be able to detect the assignments directed to them.

A PDCCH is mapped to a number of CCEs (Control Channels Elements). A PDCCH consists of an aggregation of 1, 2, 4 or 8 CCEs. These four different alternatives are herein referred to as aggregation levels 1, 2, 4, and 8 respectively. Each CCE may only be utilized on one aggregation level at a time. The variable size achieved by the different aggregation levels is used to adapt the coding rate to the required BLER level for each UE. The total number of available CCEs in a subframe will vary depending on several parameters, such as the number of OFDM symbols used for the control region, the number of antennas, the system bandwidth, the PHICH (Physical HARQ Indicator Channel) size etc.

Each CCE consists of 36 REs. However, in order to achieve time and frequency diversity for the PDCCHs, each CCE and its REs are spread out, both in time over the OFDM symbols used for the control region and in frequency over the configured bandwidth. This is achieved through a number of operations including interleaving, and cyclic shifts etc. These operations are however completely known to the UEs.

In the preferred embodiment of the invention, the PDCCH space may be divided, as will be described in more detail below.

Figure 3:
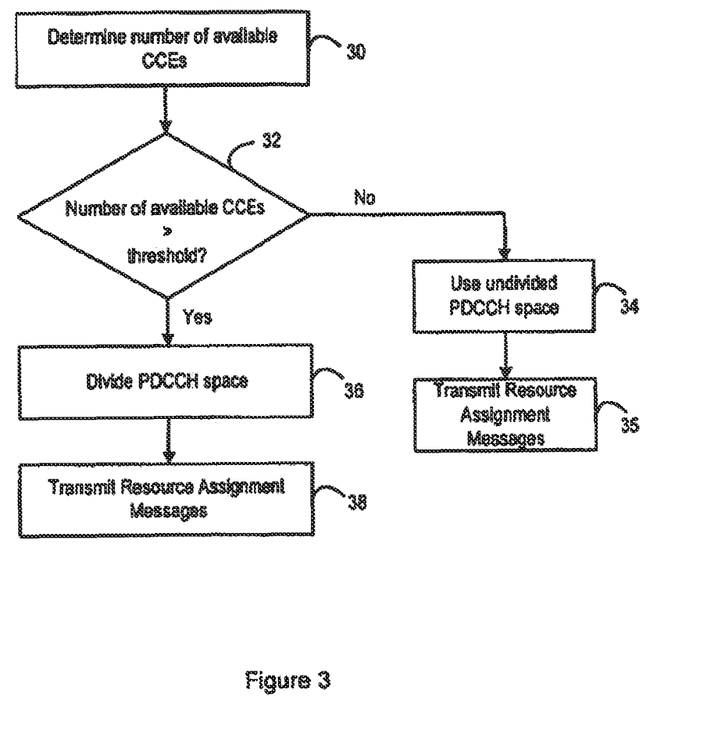
FIG. 3 is a first flow chart, illustrating a method performed in a network node in accordance with an aspect of the present invention.

FIG. 3 is a flow chart, illustrating a process performed in the eNodeB, in order to determine whether to divide the PDCCH space into multiple group subsets. The advantage of dividing the PDCCH space into two or more group subsets is most noticeable when there are a large number of CCEs available. This is for two reasons. Firstly, it is mainly when there are a large number of CCEs that there will be a capacity problem in the UE. That is, when there are a large number of CCEs, there are many CCE combinations that, with an undivided PDCCH space, would need to be decoded by the UE, placing a large load on the UE. Secondly, it is preferable to avoid resource fragmentation when there are few CCEs.

Thus, the process is advantageously performed whenever the number of CCEs may change. At start up or at reconfiguration the bandwidth, and hence the number of subcarriers in the system, could change, which is one of many parameters determining the amount of CCEs and hence in turn the total amount of possible PDCCHs.

In addition, the size of the control region, i.e., the number of OFDM symbols used for it, is also an important parameter for determining how many PDCCHs are possible in total. Since this could vary from one subframe to another, the division of the PDCCH space should preferably also vary on a subframe basis. This can be achieved by performing the complete process once per subframe. Alternatively, if the number of different possible divisions of the PDCCH space is not too large, the possible divisions could be determined at startup of the eNodeB and then stored for all combinations of bandwidth and control region size, and any other relevant parameters.

Thus, in step 30 of the process illustrated in FIG. 3, the number of available CCEs is determined and, in step 32, this number is compared with a threshold number. If the number of available CCEs does not exceed the threshold number, the process passes to step 34, in which it is determined that an undivided PDCCH space should be used. For example, the threshold number of CCEs, below which the undivided PDCCH space is used, may for example be set to about 10 or 15 CCEs. In this case, for example, every UE must decode every possible PDCCH. In step 35, the eNodeB is then able to transmit PDCCHs to UEs, for example containing resource assignment messages, using this undivided PDCCH space.

If it is determined in step 32 that the number of available CCEs exceeds the threshold number, the process passes to step 36, in which it is determined that a divided PDCCH space should be used, as will be described in more detail below.

Following the division of the PDCCH space, the eNodeB will be able to transmit PDCCHs, for example containing resource assignment messages, to UEs as shown in step 38, again as will be described in more detail below.

Figure 4:
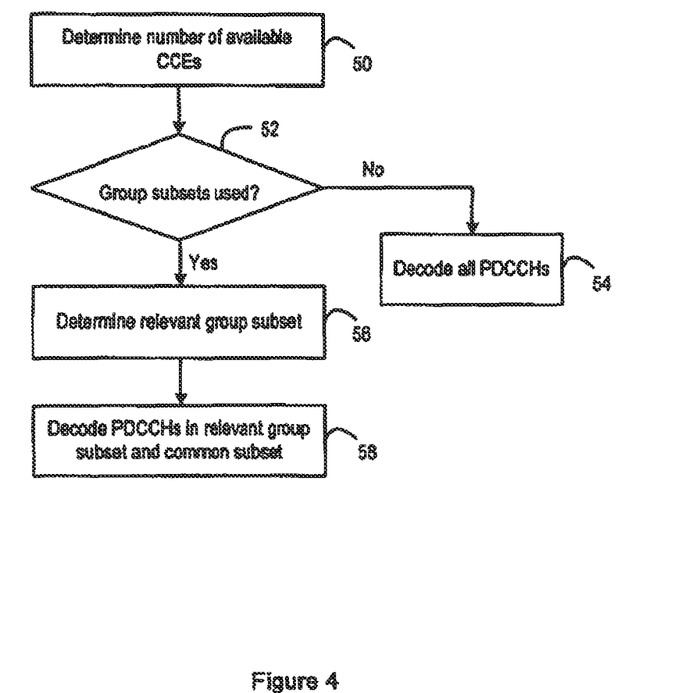
FIG. 4 is a second flow chart, illustrating a method performed in a user equipment in accordance with an aspect of the present invention.

FIG. 4 is a flow chart, illustrating a process performed in a UE, preferably in each subframe, in order to determine which part of the PDCCH space it must decode.

Thus, in step 50 of the process illustrated in FIG. 3, the number of available CCEs is determined. Specifically, the UE should calculate the number of CCEs for each subframe. The number of CCEs in each subframe can easily be calculated from the PCFICH indicator, the configured bandwidth, PHICH size and duration, number of antennas etc. All of these, except the PCFICH, are assumed to be semi-statically configured.

In step 52, the UE determines from the calculated number of CCEs in each subframe whether group subsets are used or not. For example, as described above with reference to FIG. 3, the number of CCEs in each subframe can be compared with a threshold number. This threshold number must of course be the same as the threshold number used by the eNodeB in step 32. The threshold number can be predefined, and stored in the eNodeB and the UE, or it can be signaled from the eNodeB to the UE, for example in RRC signalling.

If group subsets are not used, the process passes to step 54, in which it is determined that the UE must decode every possible PDCCH.

If it is determined in step 52 that group subsets are being used, the process passes to step 56, in which the UE determines which group subset to decode. More specifically, the UE should know by some implicit mapping or signaling which group subset to decode. There are several straightforward methods that could be utilized to achieve an implicit mapping. One example is modulo counting of the Radio Network Temporary Identifier (RNTI) of the UE, in order to determine the starting location for the group subset. Of course, the UE must use the same method that was used in the eNodeB to allocate UEs to group subsets.

In step 58, the UE decodes the PDCCHs in the relevant group subset, determined in step 56, and in the common subset.

As mentioned above, when the number of available CCEs is above a threshold value, and it is decided to divide the PDCCH space, there are at least two group subsets. It may be advantageous that the number of group subsets that are used grows beyond two with an increasing total number of available CCEs, although the number of group subsets may not grow in direct proportion with the total number of available CCEs.

However, neither details with respect to number of group subsets nor details about how a UE is mapped to a certain group subset are essential for the invention.

Figure 5:
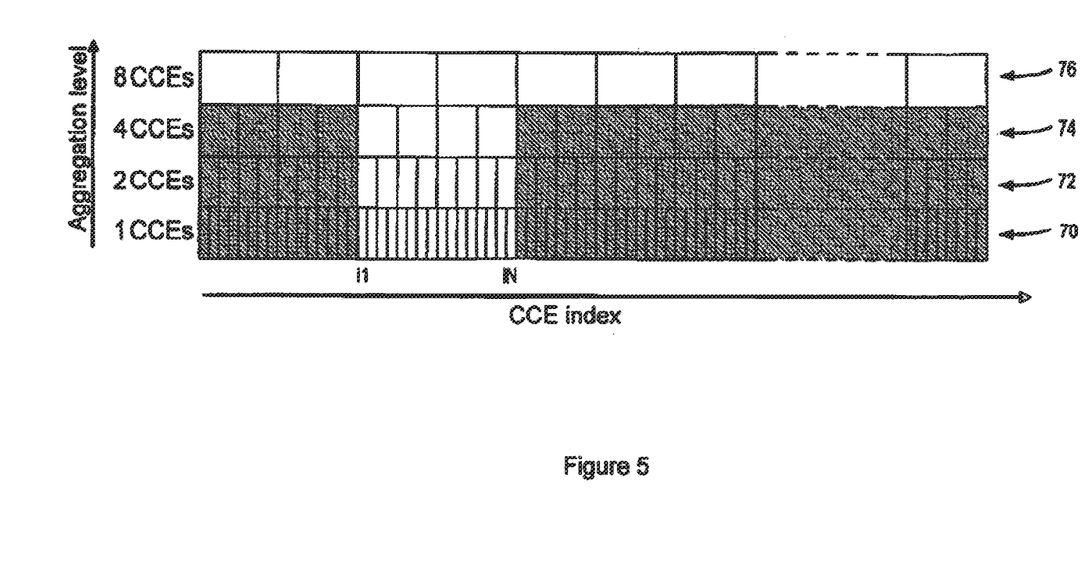
FIG. 5 is a schematic diagram, illustrating a division of the PDCCH space.

FIG. 5 shows the available CCE resources at one particular time, by way of example. Thus, there are a number of CCEs, each having a respective CCE index, as shown along the horizontal axis in FIG. 5. These CCEs can be combined with different aggregation levels, as is known. Thus, FIG. 5 shows the CCEs 70 with the lowest aggregation level of 1, but also shows the CCEs in aggregations 72 with an aggregation level of 2, in aggregations 74 with an aggregation level of 4, and in aggregations 76 with the highest aggregation level of 8. As is known, the PDCCH space includes all CCEs on all aggregation levels.

According to an exemplary embodiment, one common subset is defined, in addition to the group subsets mentioned above. This subset of PDCCHs is then mandatory for all UEs to decode.

In the example shown in FIG. 5, the common subset is defined to contain certain CCEs at a certain aggregation level. The common subset may advantageously be formed to cover the largest possible PDCCH size, i.e. 8 CCEs in the example shown in FIG. 5. By defining the common subset as all possible PDCCHs on aggregation level 8, more or less the whole CCE space can be covered with a small set of PDCCHs, and so all CCEs are enabled for use by any UE without forcing each UE to decode a large number of PDCCH candidates. By instead defining the common subset to include possible PDCCHs on lower aggregation levels, more decodings by the UE would be required in order to cover a certain CCE space.

Group subsets may for example be formed to cover a certain set of CCE resources corresponding to certain CCE indices. The possible PDCCHs within each group subset are then defined by the possible aggregations into PDCCHs from the CCE indices defined as resources for that group subset. All possible PDCCHs on all aggregation levels (i.e., 1, 2, 4, and 8) for all CCE indices of the group may then be defined to be part of that specific group subset.

Thus, the common subset or each common subset will be decoded by every UE, and each group subset will be decoded only by a limited group of UEs.

In the example shown in FIG. 5, one group subset is defined to cover all possible PDCCHs on all aggregation levels (i.e., 1, 2, 4, and 8) for all CCE indices in the range from i1 to iN. This group subset therefore covers certain CCE indices, namely from CCE index i1 to iN, on each of aggregation levels 1, 2, 4, and 8.

As an alternative, a group subset may be defined such that it contains CCEs at one aggregation level that do not overlap with the CCEs at a different aggregation level. For example, a group subset may be defined so that it covers a first set of CCEs at aggregation level 8 extending over the first half of the range from i1 to iN (i.e. from i1 to i[N/2] and a second set of CCEs at aggregation level 4 extending over the upper half of the range from i1 to iN (i.e. from i[N/2+1] to iN).

Thus, in order to avoid the need to send PDCCHs for broadcast messages in all group subsets, a common subset is utilized for broadcast messages. Since, in the illustrated embodiment, the common subset includes the PDCCHs containing the larger number of CCEs, these are well suited for broadcast messages which typically need to cover the whole cell. By utilizing the common subset for broadcasting, huge savings are achieved in terms of CCE resources, since the same assignment would otherwise have to be sent in many different group subsets and in each of them probably occupy a large number of CCEs in order to cover the cell.

The definition of the common subset allows messages to be allocated to PDCCHs in an efficient manner. In the case where most of the users at a given time are utilizing the same group subset, then the most expensive PDCCHs, i.e., the PDCCHs containing many CCEs, can be moved to PDCCHs which are part of the common subset. By doing this, several smaller PDCCHs, i.e., PDCCHs consisting of only a few CCEs, are made free. In this way unwanted skewed distributions, with respect to the number of users utilizing the different group subsets, can be handled in an efficient way where the complete PDCCH resource can potentially still be utilized. For example, where a message, that is to be sent to one specific UE, requires many CCEs, that message can be sent on a PDCCH in the common subset. This will still ensure that the specific UE will decode the message, and will allow the PDCCHs in the group subset to be used for sending smaller messages to the UEs that will decode that group subset.

In order to make the solution even more flexible, an optional upgrade of PDCCHs occupying fewer CCEs per PDCCH compared to the PDCCHs in the common subset is introduced. This means that the number of CCEs per PDCCH can be increased to an aggregation level above what is needed in order to adapt to the link. As a result, PDCCHs, no matter the required size in terms of number of CCEs, can be upgraded to an aggregation level corresponding to 8 CCEs (or whatever is the largest aggregation level set in the standard) for a PDCCH. Hence, any PDCCH, no matter the required aggregation level or which UE it is aimed for, can potentially be moved to cover any CCE index.

For example, in the case where a group subset is defined in such a way that it contains CCEs at one aggregation level that do not overlap with the CCEs at a different aggregation level, and in the situation where it is desired to transmit a PDCCH requiring a low aggregation level (for example aggregation level 2) but all possible PDCCHs at that low aggregation level are occupied, then that PDCCH can be transmitted at a higher aggregation level (for example aggregation level 4) using different CCEs within the group subset.

There is thus disclosed a method for allocating communications resources.

The present invention may, of course, be carried out in other ways than those specifically set forth herein without departing from essential characteristics of the invention. The present embodiments are to be considered in all respects as illustrative and not restrictive, and all changes coming within the meaning and equivalency range are intended to be embraced therein.

The invention claimed is:

1. A method of operation of a user equipment in a cellular network, the method comprising:
    receiving, by the user equipment, a downlink subframe, the downlink subframe comprising a plurality of downlink control channels;
    determining a division of the downlink control channels into at least one common subset of the downlink control channels and a plurality of group subsets of the downlink control channels, the determination being based, at least in part, on an assignment of resources received by the user equipment in a control region of the downlink subframe, the at least one common subset being a subset of downlink control channels which is mandatory for all user equipments in the cellular network to decode, and the plurality of group subsets being a plurality of subsets of downlink control channels in which decoding of any particular group subset among the plurality of group subsets is mandatory for a limited group of user equipments in the cellular network;
    determining a group subset from the plurality of group subsets to decode, the determined group subset being a relevant group subset; and
    decoding the downlink control channels forming the common subset or each common subset of the downlink control channels, and decoding only the downlink control channels of the relevant group subset of the downlink control channels.

2. A method as claimed in claim 1, wherein determining the division of the downlink control channels into at least one common subset of the downlink control channels and a plurality of group subsets of the downlink control channels comprises:
    determining a number of control channel elements in each sub frame; and
    determining from said number of control channel elements in each subframe whether a division into two or more group subsets has been done.

3. A user equipment for communicating in a cellular network comprising at least one processor configured to cause the apparatus to perform at least the following:
    receive a downlink subframe, the downlink subframe comprising a plurality of downlink control channels;
    determine a division of the downlink control channels into at least one common subset of the downlink control channels and a plurality of group subsets of the downlink control channels, the determination being based, at least in part, on an assignment of resources received by the user equipment in a control region of the downlink subframe, the at least one common subset being a subset of downlink control channels which is mandatory for all user equipments in the cellular network to decode, and the plurality of group subsets being a plurality of subsets of downlink control channels in which decoding of any particular group subset among the plurality of group subsets is mandatory for a limited group of user equipments in the cellular network;
    determine a group subset from the plurality of group subsets to decode, the determined group subset being a relevant group subset;
    decoding the downlink control channels forming the common subset or each common subset of the downlink control channels; and
    decoding only the downlink control channels of the relevant group subset of the downlink control channels.

4. A user equipment as claimed in claim 3, wherein the user equipment being configured to determine the division of the downlink control channels into at least one common subset of the downlink control channels and a plurality of group subsets of the downlink control channels comprises the user equipment being configured to:
    determine a number of control channel elements in each subframe; and
    determine from said number of control channel elements in each subframe whether group subsets are used.

* * * * *